(12) United States Patent
Barton et al.

(10) Patent No.: US 7,717,672 B2
(45) Date of Patent: May 18, 2010

(54) RADIAL VANED DIFFUSION SYSTEM WITH INTEGRAL SERVICE ROUTINGS

(75) Inventors: Michael T. Barton, Phoenix, AZ (US); Harry L. Kington, Scottsdale, AZ (US); Donald L. Palmer, Cave Creek, AZ (US)

(73) Assignee: Honeywell International Inc., Morristown, NJ (US)

( * ) Notice: Subject to any disclaimer, the term of this patent is extended or adjusted under 35 U.S.C. 154(b) by 840 days.

(21) Appl. No.: 11/512,559

(22) Filed: Aug. 29, 2006

(65) Prior Publication Data

US 2008/0056892 A1  Mar. 6, 2008

(51) Int. Cl.
F01D 9/04 (2006.01)
(52) U.S. Cl. .................................. 415/208.2; 415/211.2
(58) Field of Classification Search .................. 415/111, 415/112, 208.1, 208.2, 208.3, 211.1, 211.2, 415/191, 193, 208.4, 209.1, 209.4
See application file for complete search history.

(56) References Cited

U.S. PATENT DOCUMENTS

| | | | | |
|---|---|---|---|---|
| 2,111,136 | A * | 3/1938 | Bauer | 415/81 |
| 2,489,692 | A * | 11/1949 | Whittle | 415/208.2 |
| 3,214,908 | A | 11/1965 | Jones et al. | |
| 3,279,384 | A | 10/1966 | Jekat et al. | |
| 3,703,081 | A | 11/1972 | Krebs et al. | |
| 3,778,194 | A | 12/1973 | Miller et al. | |
| 3,861,826 | A * | 1/1975 | Dean, Jr. | 415/208.4 |
| 3,873,232 | A * | 3/1975 | Stein et al. | 415/207 |
| 3,930,746 | A * | 1/1976 | Kronogard | 415/149.1 |
| 4,027,997 | A * | 6/1977 | Bryans | 415/207 |
| 4,264,272 | A | 4/1981 | Weiler | |
| 4,648,241 | A | 3/1987 | Putman et al. | |
| 5,107,676 | A | 4/1992 | Hadaway et al. | |
| 5,496,150 | A | 3/1996 | Claxton, III et al. | |
| 6,279,322 | B1 * | 8/2001 | Moussa | 60/751 |
| 6,280,139 | B1 | 8/2001 | Romani et al. | |
| 6,540,481 | B2 * | 4/2003 | Moussa et al. | 415/208.2 |
| 2005/0095127 | A1 | 5/2005 | Sasu et al. | |

FOREIGN PATENT DOCUMENTS

DE  4412314 A1  10/1995

\* cited by examiner

*Primary Examiner*—Edward Look
*Assistant Examiner*—Nathaniel Wiehe
(74) *Attorney, Agent, or Firm*—Ingrassia Fisher & Lorenz, P.C.

(57) ABSTRACT

A radial diffuser comprises a housing, a plurality of diffuser vanes, and a plurality of integral service vanes. The housing includes an air inlet and an air outlet, and defines a radial section extending radially outward from the air inlet, an axial section extending axially to the air outlet, and a transition including a bend and extending between the radial and axial sections. The diffuser vanes are coupled to the housing, and are disposed in, and define diffusion flow passages. The integral service vanes are coupled to the housing, extend around the bend, and define transition flow passages, each in fluid communication with at least one diffusion flow passage. At least some of the integral service vanes include a service passage extending therethrough and configured to allow a service conduit to extend therethrough without crossing either a diffusion flow passage or a transition flow passage.

20 Claims, 8 Drawing Sheets

RADIAL VANED DIFFUSION SYSTEM WITH INTEGRAL SERVICE ROUTINGS

TECHNICAL FIELD

The present invention relates to diffusers, and more particularly, to a diffuser with bend and deswirl features.

BACKGROUND

Aircraft main engines not only provide propulsion for the aircraft, but in many instances may also be used to drive various other rotating components such as, for example, generators, compressors, and pumps, to thereby supply electrical, pneumatic, and/or hydraulic power. Generally, a gas turbine engine includes a combustor, a power turbine, and a compressor. During operation of the engine, the compressor draws in ambient air, compresses it, and supplies compressed air to the combustor. The compressor also typically includes a diffuser that diffuses the compressed air before it is supplied to the combustor. The combustor receives fuel from a fuel source and the compressed air from the compressor, and supplies high energy compressed air to the power turbine, causing it to rotate. The power turbine includes a shaft that may be used to drive the compressor.

In some instances, an engine may additionally include a starter-generator, which may either drive the turbine or be driven by the turbine, via the turbine output shaft. Some engines additionally include a bleed air port between the compressor section and the turbine section. The bleed air port allows some of the compressed air from the compressor section to be diverted away from the turbine section, and used for other functions such as, for example, main engine starting air, environmental control, and/or cabin pressure control.

Gas turbine engines are constructed using one of several different bearing architectures. In one type of engine architecture, namely the popular "midsump" architecture, a bearing cavity, often referred to as a "sump", is housed in proximity to the combustor near the middle of the engine. The bearing cavity, or sump, relies on service routings to supply various services such as air and oil thereto.

Although most engines, such as those generally described above, are robust, safe, and generally reliable, some engines do suffer certain drawbacks. For example, in certain midsump engines having compressors with radial vane diffusers, it may be more difficult to supply air or oil service, a structural tie to external structures, electrical service for sensors, or other types of service to a bearing cavity or other region within the engine without crossing the air flow path within the diffuser.

Accordingly, there is a need for an improved system for providing oil and air service, and/or other types of service, to an engine with a radial vane diffuser without crossing the air flow path within the diffuser. The present invention addresses one or more of these needs.

BRIEF SUMMARY

The present invention provides a system for providing oil and air service to an engine with a radial vane diffuser without crossing the air flow path within the diffuser.

In one embodiment, and by way of example only, the system comprises a radial diffuser comprising a housing, a plurality of diffuser vanes, and a plurality of integral service vanes. The housing includes an air inlet and an air outlet, and defines a radial section, an axial section, and a transition between the air inlet and air outlet. The radial section extends at least substantially radially outward from the air inlet to the transition. The axial section extends at least substantially axially from the transition to the air outlet. The transition includes a bend, and extends between the radial section and the axial section. The plurality of diffuser vanes is coupled to the housing, and is disposed in the radial section. The plurality of diffuser vanes defines a plurality of diffusion flow passages through the radial section. The plurality of integral service vanes is coupled to the housing, and extends around the bend in the transition. The plurality of integral service vanes defines a plurality of transition flow passages through the transition. Each transition flow passage is in fluid communication with at least one diffusion flow passage. At least a portion of the integral service vanes include a service passage extending therethrough. Each service passage is configured to allow a service conduit to extend therethrough without crossing either a diffusion flow passage or a transition flow passage.

In another embodiment, and by way of example only, the system comprises a compressor comprising a compressor housing, an impeller, and a radial diffuser for directing a flow of compressed air with a radial component to a diffused annular flow having an axial component. The impeller is rotationally mounted within the compressor housing, and has a leading edge and a trailing edge. The impeller is operable, upon rotation thereof, to discharge a flow of air having a velocity magnitude and a pressure magnitude from the trailing edge. The radial diffuser comprises a diffuser housing, a plurality of diffuser vanes, and a plurality of integral service vanes. The diffuser housing includes an air inlet and an air outlet, and defines a radial section, an axial section, and a transition between the air inlet and air outlet. The air inlet is in fluid communication with the impeller trailing edge to thereby receive the flow of air discharged therefrom. The radial section extends at least substantially outward from the air inlet to the transition. The axial section extends at least substantially axially from the transition to the air outlet. The transition includes a bend, and extends between the radial section and the axial section. The plurality of diffuser vanes is coupled to the diffuser housing, and is disposed in the radial section. The plurality of diffuser vanes defines a plurality of diffusion flow passages through the radial section. The plurality of integral service vanes is coupled to the diffuser housing, and extends around the bend in the transition. The plurality of integral service vanes defines a plurality of transition flow passages through the transition. Each transition flow passage is in fluid communication with at least one diffusion flow passage. At least a portion of the integral service vanes include a service passage extending therethrough. Each service passage is configured to allow a service conduit to extend therethrough without crossing either a diffusion flow passage or a transition flow passage.

In yet another embodiment, and by way of example only, the system comprises a gas turbine engine comprising an engine housing, a compressor, a combustor, and a turbine all mounted in flow series within the housing. The compressor includes at least a compressor housing, an impeller, and a radial diffuser for directing a flow of compressed air with a radial component to a diffused annular flow having an axial component. The impeller is rotationally mounted within the compressor housing, and has a leading edge and a trailing edge. The impeller is operable, upon rotation thereof, to discharge a flow of air having a velocity magnitude and a pressure magnitude from the trailing edge. The radial diffuser comprises a diffuser housing, a plurality of diffuser vanes, and a plurality of integral service vanes. The diffuser housing includes an air inlet and an air outlet, and defines a radial section, an axial section, and a transition between the air inlet and air outlet. The air inlet is in fluid communication with the impeller trailing edge to thereby receive the flow of air discharged therefrom. The radial section extends at least substantially radially outward from the air inlet to the transition. The axial section extends at least substantially axially from the transition to the air outlet. The transition includes a bend, and extends between the radial section and the axial section. The plurality of diffuser vanes is coupled to the diffuser housing, and is disposed in the radial section. The plurality of diffuser vanes defines a plurality of diffusion flow passages through the radial section. The plurality of integral service vanes is coupled to the diffuser housing, and extends around the bend in the transition. The plurality of integral service vanes defines a plurality of transition flow passages through the transition. Each transition flow passage is in fluid communication with at least one diffusion flow passage. At least a portion of the integral service vanes include a service passage extending therethrough. Each service passage is configured to allow a service conduit to extend therethrough without crossing either a diffusion flow passage or a transition flow passage.

Other independent features and advantages of the preferred systems will become apparent from the following detailed description, taken in conjunction with the accompanying drawings which illustrate, by way of example, the principles of the invention.

DETAILED DESCRIPTION OF A PREFERRED EMBODIMENT

Before proceeding with a detailed description, it is to be appreciated that the described embodiment is not limited to use in conjunction with a particular type of turbine engine or particular type of compressor. Thus, although the present embodiment is, for convenience of explanation, depicted and described as being implemented in an engine having a two-stage centrifugal compressor and other specific characteristics, it will be appreciated that it can be implemented as various other types of compressors, engines, turbochargers, and various other fluid devices, and in various other systems and environments.

Figure 1:
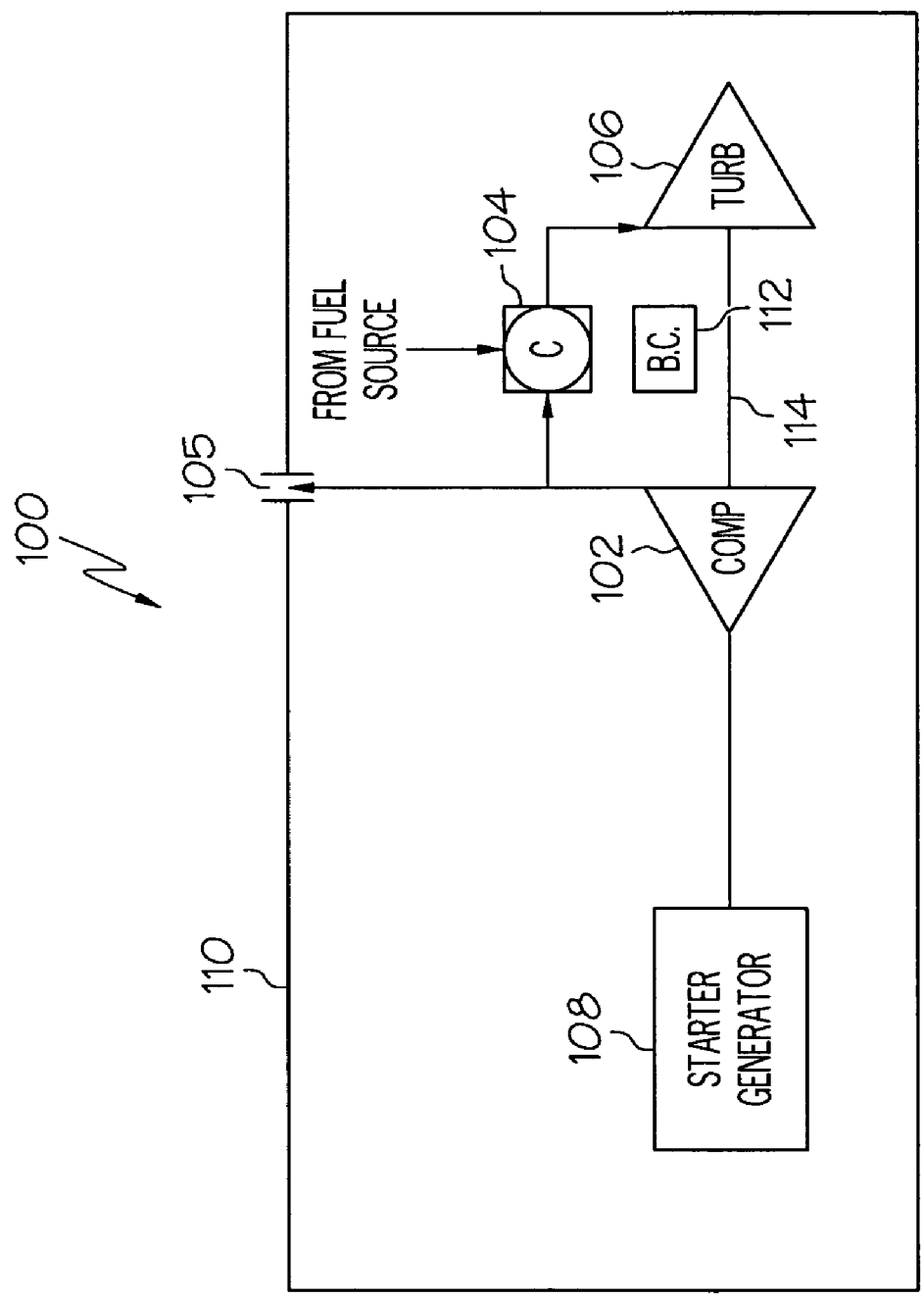
FIG. 1 is a schematic representation of a gas turbine engine according to an exemplary embodiment of the present invention.

Turning now to the description, and with reference first to FIG. 1, an embodiment of an exemplary gas turbine engine 100 is shown in simplified schematic form. The engine 100 may be an auxiliary power unit (APU) for an aircraft, or any of a number of other different types of gas turbine engines. The engine 100 includes a compressor 102, a combustor 104, a turbine 106, and a starter-generator unit 108, all preferably housed within a single containment housing 110. As shown in FIG. 1, certain engines 100 may also have a bearing cavity 112 housed in proximity to the combustor 104, or otherwise in the interior of the engine 100, that requires routings for service such as air and oil for proper functioning.

During operation of the engine 100, the compressor 102 draws ambient air into the containment housing 110. The compressor 102 compresses the ambient air, and supplies a portion of the compressed air to the combustor 104, and may also supply compressed air to a bleed air port 105. The bleed air port 105, if included, is used to supply compressed air to a non-illustrated environmental control system. It will be appreciated that the compressor 102 may be any one of numerous types of compressors now known or developed in the future.

The combustor 104 receives the compressed air from the compressor 102, and also receives a flow of fuel from a non-illustrated fuel source. The fuel and compressed air are mixed within the combustor 104, and are ignited to produce relatively high-energy combustion gas. The combustor 104 may be implemented as any one of numerous types of combustors now known or developed in the future. Non-limiting examples of presently known combustors include various can-type combustors, various reverse-flow combustors, various through-flow combustors, and various slinger combustors.

No matter the particular combustor 104 configuration used, the relatively high-energy combustion gas that is generated in the combustor 104 is supplied to the turbine 106. As the high-energy combustion gas expands through the turbine 106, it impinges on the turbine blades (not shown in FIG. 1), which causes the turbine 106 to rotate. The turbine 106 includes an output shaft 114 that drives the compressor 102.

Figure 2:
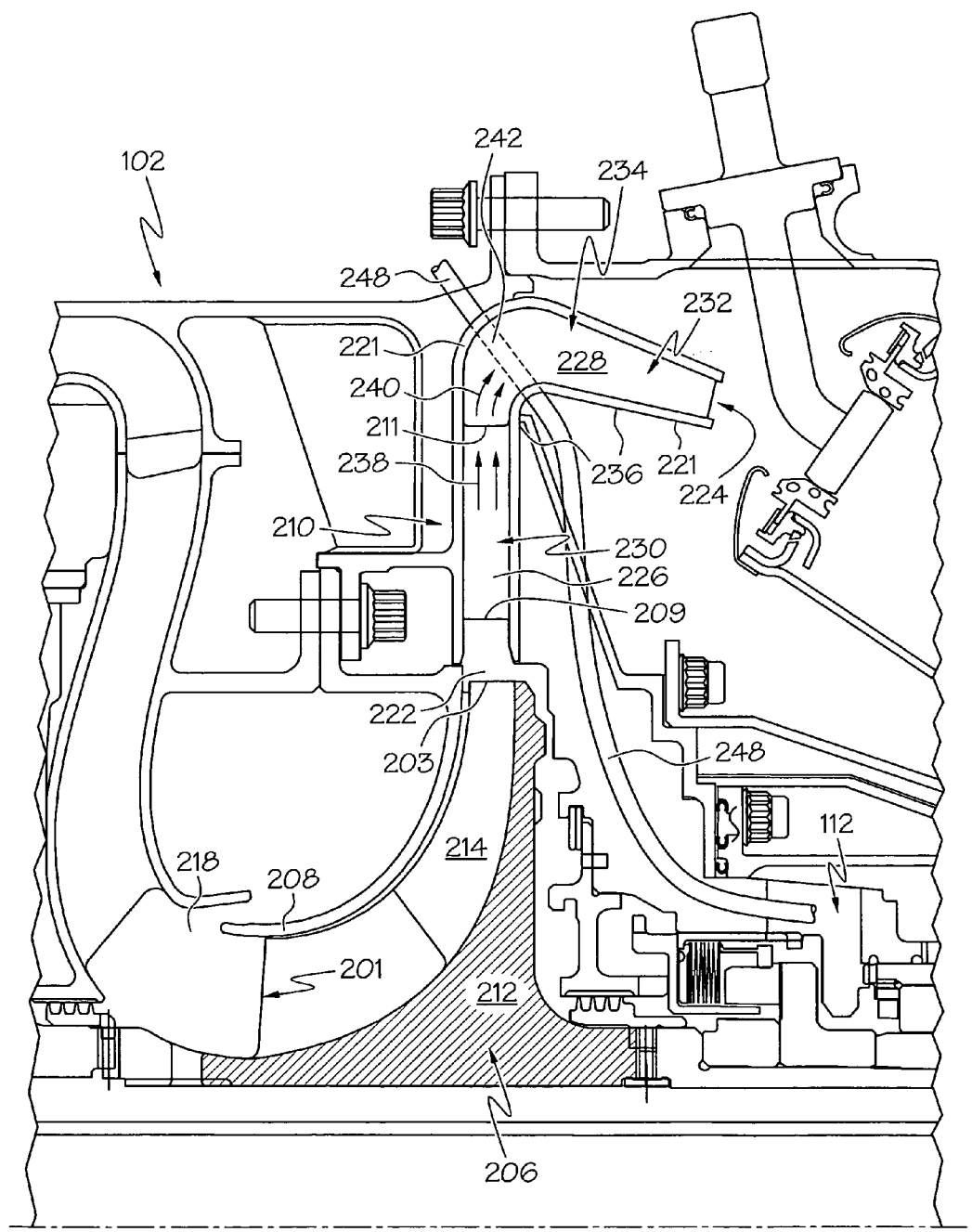
FIG. 2 is a cross section view of an exemplary compressor, featuring a radial diffuser with diffuser vanes and integral service vanes, that may be used in the gas turbine engine of FIG. 1.

Turning now to FIG. 2, a more detailed description of the compressor 102 will be provided. In the depicted embodiment, the compressor 102 is a two-stage centrifugal compressor and includes an impeller 206, a shroud 208, and a diffuser 210. The impeller 206 is mounted on the output shaft 114, via a hub 212, and is thus rotationally driven by either the turbine 106 or the starter-generator 108, as described above. A plurality of spaced-apart blades 214 extend generally radially from the hub 212 and together therewith define a leading edge 201 and a trailing edge 203. As is generally known, when the impeller 206 is rotated, the blades 214 draw air into the impeller 206, via the leading edge 201, and increase the velocity of the air to a relatively high velocity. The relatively high velocity air is then discharged from the impeller 206, via the trailing edge 203.

The shroud 208 is disposed adjacent to, and partially surrounds, the impeller blades 214. The shroud 208, among other things, cooperates with an annular inlet duct 218 to direct the air drawn into the engine 100 by the compressor 102 into the impeller 206.

The diffuser 210 is a radial vane diffuser that is disposed adjacent to, and surrounds a portion of, the impeller 206. The diffuser 210 is configured to direct a flow of compressed air with a radial component to a diffused annular flow having an axial component. The diffuser 210 additionally reduces the velocity of the air and increases the pressure of the air to a higher magnitude. The diffuser 210 includes a housing 221, a plurality of diffuser vanes 226, and a plurality of integral service vanes 228.

The diffuser housing 221 includes an air inlet 222 and an air outlet 224. The diffuser housing also defines a radial section 230, an axial section 232, and a transition 234 between the air inlet and outlet 222, 224. The radial section 230 extends at least substantially radially outward from the air inlet 222 to the transition 234. The axial section 232 extends at least substantially axially from the transition 234 to the air outlet 224. The transition 234 includes a bend 236, and extends between the radial section 230 and the axial section 232. Preferably, the bend 236 provides a continuous turn between the radial section 230 and the axial section 232.

The plurality of diffuser vanes 226 are coupled to the diffuser housing 221, and are disposed in the radial section 230. The plurality of diffuser vanes 226 define a plurality of diffusion flow passages 238 through the radial section 230. The diffuser vanes 226 are preferably arranged substantially tangential to the impeller trailing edge 203 and, similar to the impeller blades 214, define a leading edge 209 and a trailing edge 211.

The plurality of integral service vanes 228 are coupled to the diffuser housing 221, and extend around the bend 236 in the transition 234. The plurality of integral service vanes 228 define a plurality of transition flow passages 240 through the transition 234. Each transition flow passage 240 is in fluid communication with at least one diffusion flow passage 238. Moreover, at least a portion of the integral service vanes 228 include a service passage 242 extending therethrough. Each service passage 242 is configured to allow a service conduit 248 to extend therethrough without crossing either a diffusion flow passage 238 or a transition flow passage 240. It will be appreciated that, in certain embodiments, some integral service vanes 228 may not have a service passage 242 formed therethrough, and/or some integral service vanes 228 may each have one service passage 242 formed therethrough, and/or some integral service vanes 228 may have multiple service passages 242 formed therethrough. In addition, in certain embodiments, the service passages 242 may be further configured to allow a structural tie to external structures, electrical service for sensors, or any one of a number of other different types of service.

As shown schematically in FIG. 2 and alluded to above, the service conduits 248 extend through one or more service passages 242 in one or more of the integral service vanes 228, and provide oil, air and/or other services from one or more non-illustrated service sources to the bearing cavity 112. The service conduits 248 are made of metal tubing in a preferred embodiment; however, it will be appreciated that the service conduits 248 may be made of any of a number of different types of material. It will further be appreciated that the one or more service sources may originate outside of the engine 100, or, for certain types of services (e.g. air), may also originate inside the engine 100. It will also be appreciated that other types of service may also be provided through the service passages 242 and/or service conduits 248, from any of a number of different service sources, to any one of a number of different destinations.

Figure 3:
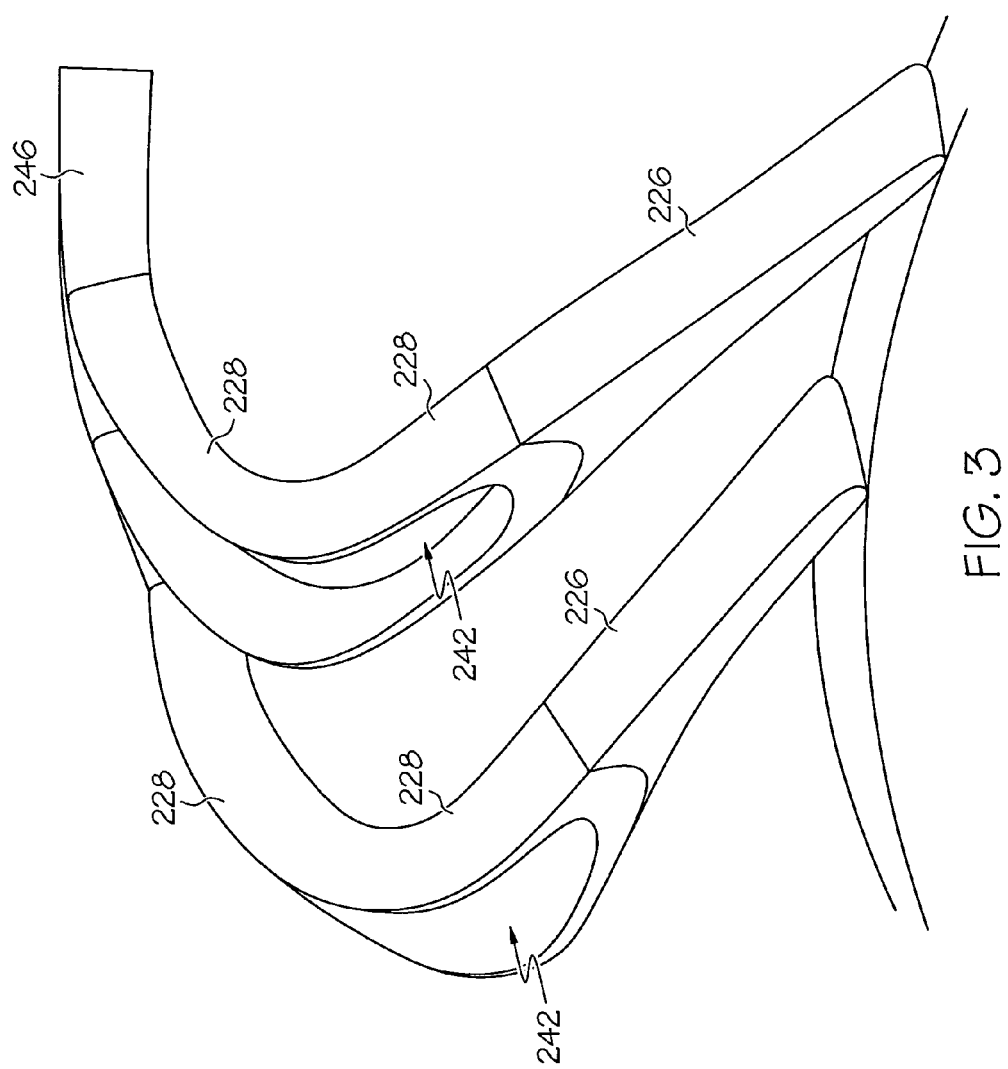
FIG. 3 is a cross section view of an exemplary embodiment of the diffuser vanes and integral service vanes of the compressor depicted in FIG. 2.

Referring now to FIG. 3, a view of a portion of an exemplary physical embodiment of the diffuser 210 is provided, which depicts two diffuser vanes 226 and two integral service vanes 228. As shown in FIG. 3, in a preferred embodiment, the plurality of integral service vanes 228 have an average thickness that is greater than the average thickness of the plurality of diffuser vanes 226, so as to allow the service passages 242 to be created therethrough.

The number of integral service vanes 228 is also preferably equal to the number of diffuser vanes 226, with each integral service vane 228 coupled to, abutting, or disposed adjacent to a single corresponding diffuser vane 226. Thus, each diffusion flow passage 238 corresponds to a transition flow passage 240. In such a preferred embodiment, the integral service vanes 228 can essentially be extensions or continuations of the diffuser vanes 226 around the bend 236 in the transition 234, preferably with a greater thickness (as described above) and/or made from a lighter material (as described below). It will be appreciated that in certain embodiments there may be fewer integral service vanes 228 than diffuser vanes 226, and/or that the diffusion flow passages 238 and the transition flow passages 240 may be placed in fluid communication with one another using any one of a number of other configurations.

As mentioned above, in a preferred embodiment the integral service vanes 228 are preferably made of a material that is different from, and lighter than, the material used to make the diffuser vanes 226. The diffuser vanes 226 are preferably made of steel, or any of a number of other metals or other types of materials capable of withstanding the relatively high temperature and pressure and resisting potential erosion over extended periods of time. In contrast, the integral service vanes 228 are preferably made of titanium or, in certain embodiments, aluminum or various types of plastics, or any number of other relatively light metals, alloys, plastics, or other materials, so as to reduce the weight of the diffuser 210.

In addition, as shown in FIG. 3, the diffuser 210 may also include a plurality of post-transition vanes 246 disposed in the axial section 232 and configured to at least partially deswirl the diffused air discharged from the radial section 230 and/or the transition 234. However, it will be appreciated that in certain embodiments such post-transition vanes 246 may not be necessary, and/or that splitter vanes 244 (shown in FIG. 4 and described below in connection therewith) may be used instead of or in combination with the post-transition vanes 246.

Figure 4:
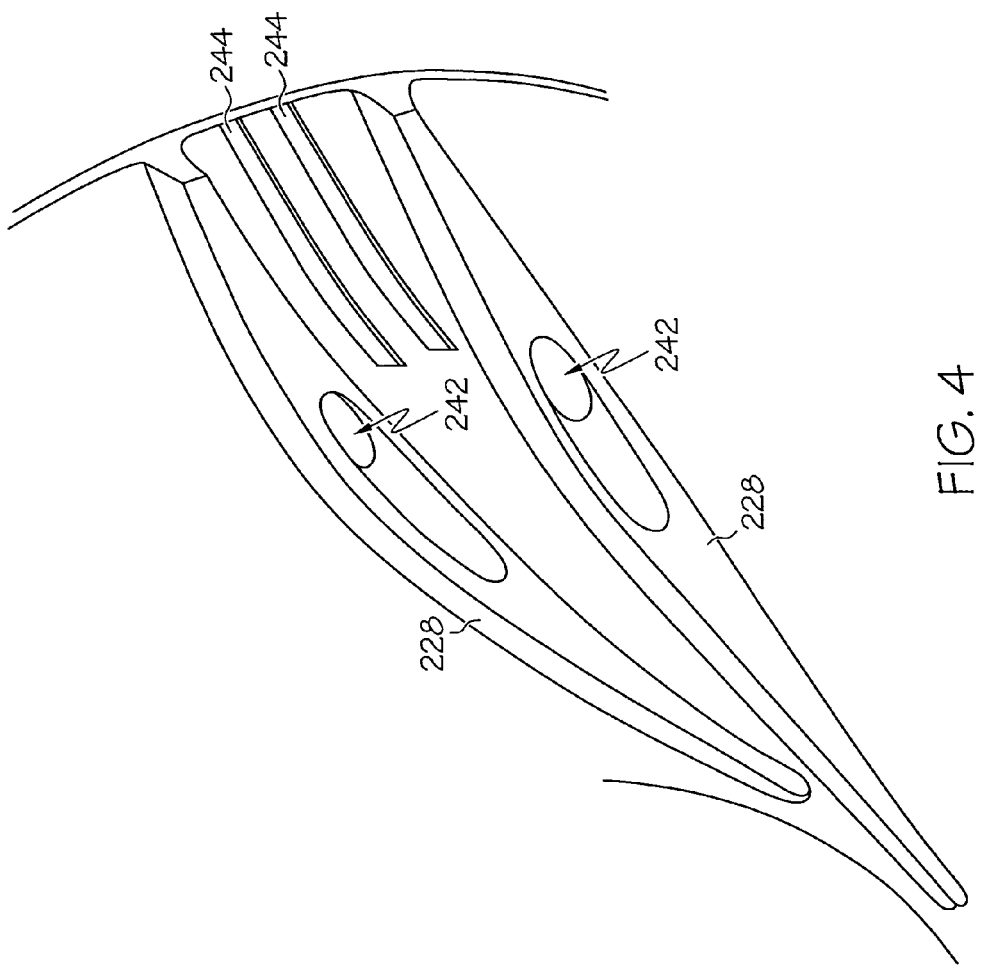
FIG. 4 provides another cross section view of the integral service vanes of FIG. 3, along with splitter vanes also from the compressor depicted in FIG. 2.
Figure 5:
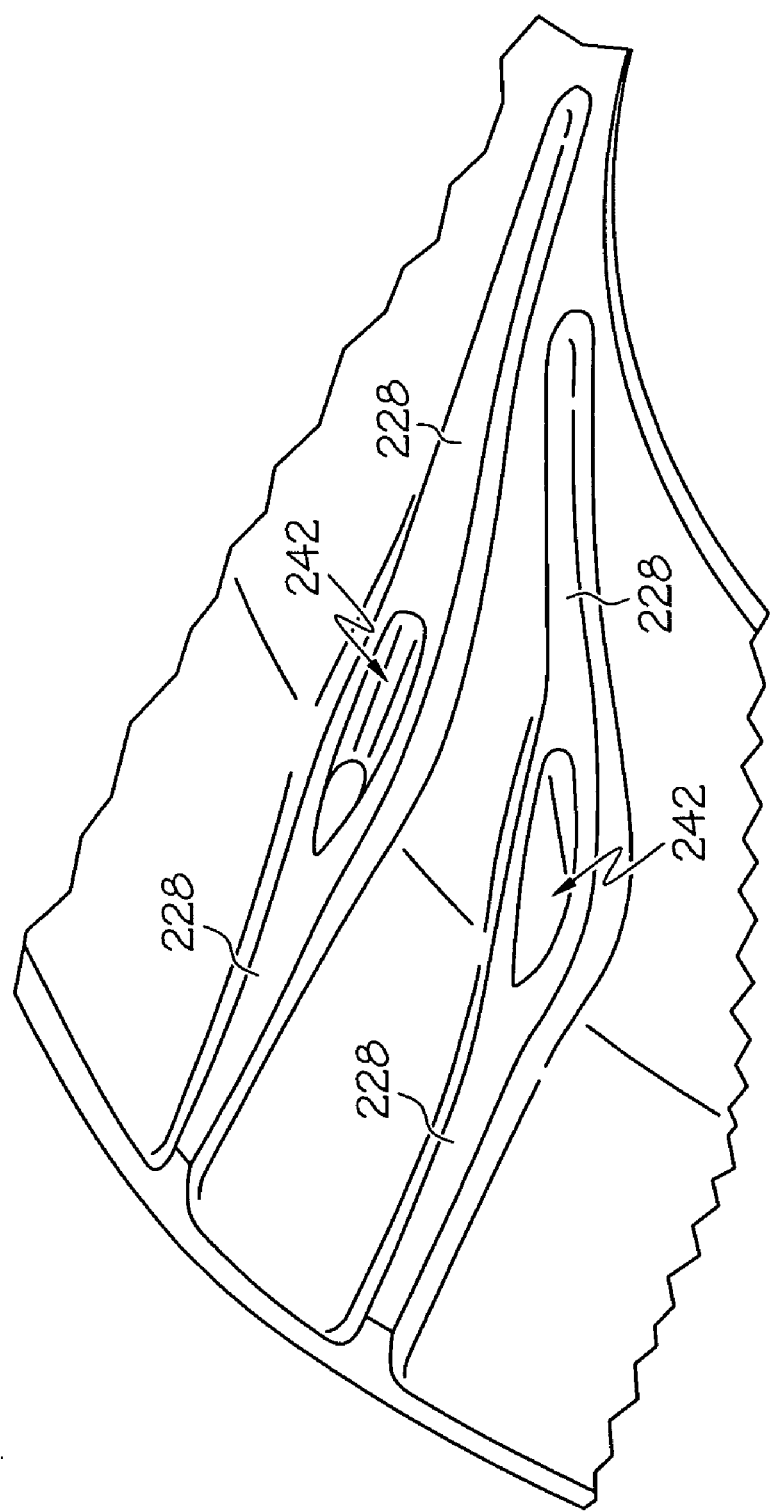
FIG. 5 provides another cross section view of the integral service vanes of FIG. 3.

Turning now to FIGS. 4 and 5, views are provided, for different embodiments, and at different angles, for the integral service vanes 228 and service passages 242. FIG. 4 also depicts the above-mentioned splitter vanes 244. The splitter vanes 244 are preferably disposed in the axial section 232, and are configured to further deswirl the diffused air discharged from the radial section 230 and/or the transition 234 of the diffuser 210. The splitter vanes 244 can therefore increase performance of the diffuser 210 when desired. However, as referenced above, in various embodiments the splitter vanes 244, similar to the post-transition vanes 246, may not be needed.

Figure 6:
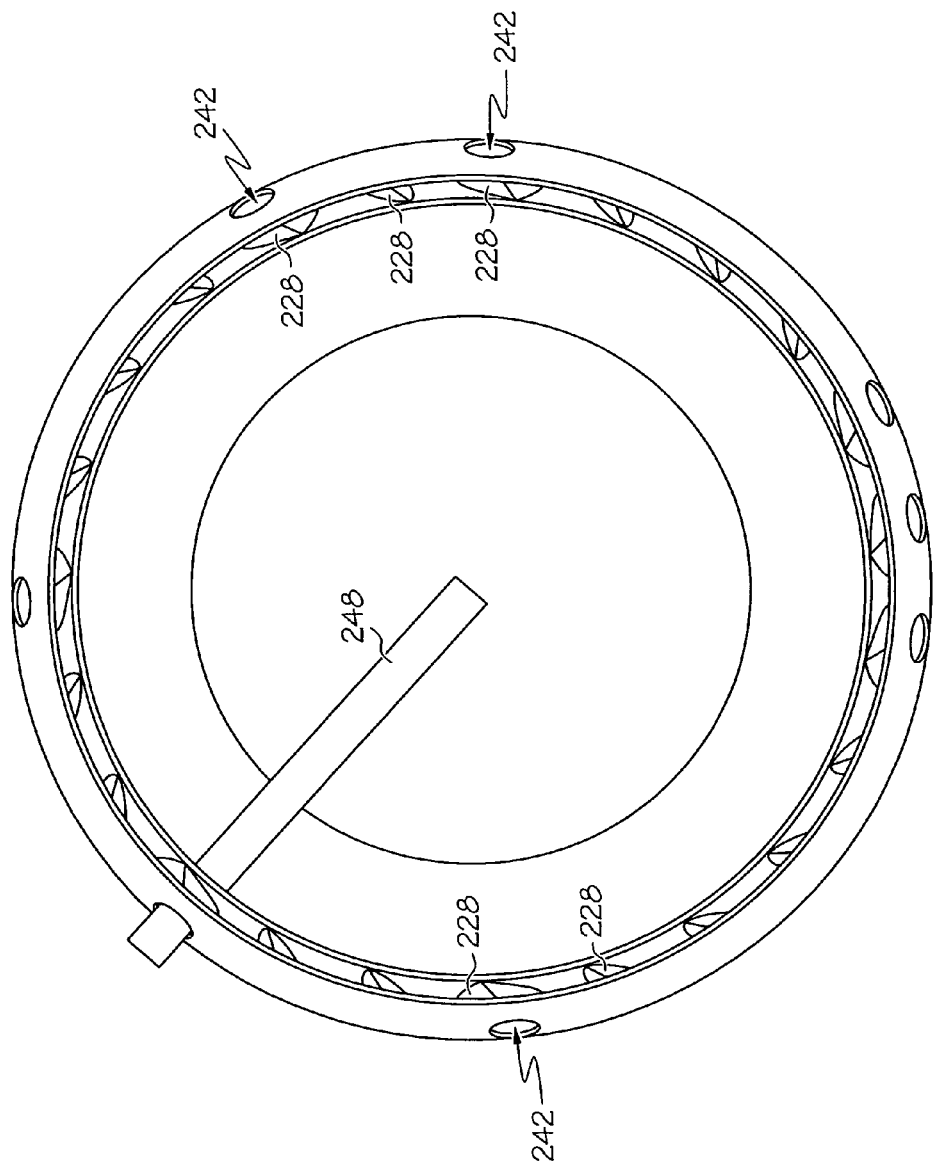
FIG. 6 provides a three dimensional view, looking forward, of the integral service vanes of FIG. 3.
Figure 7:
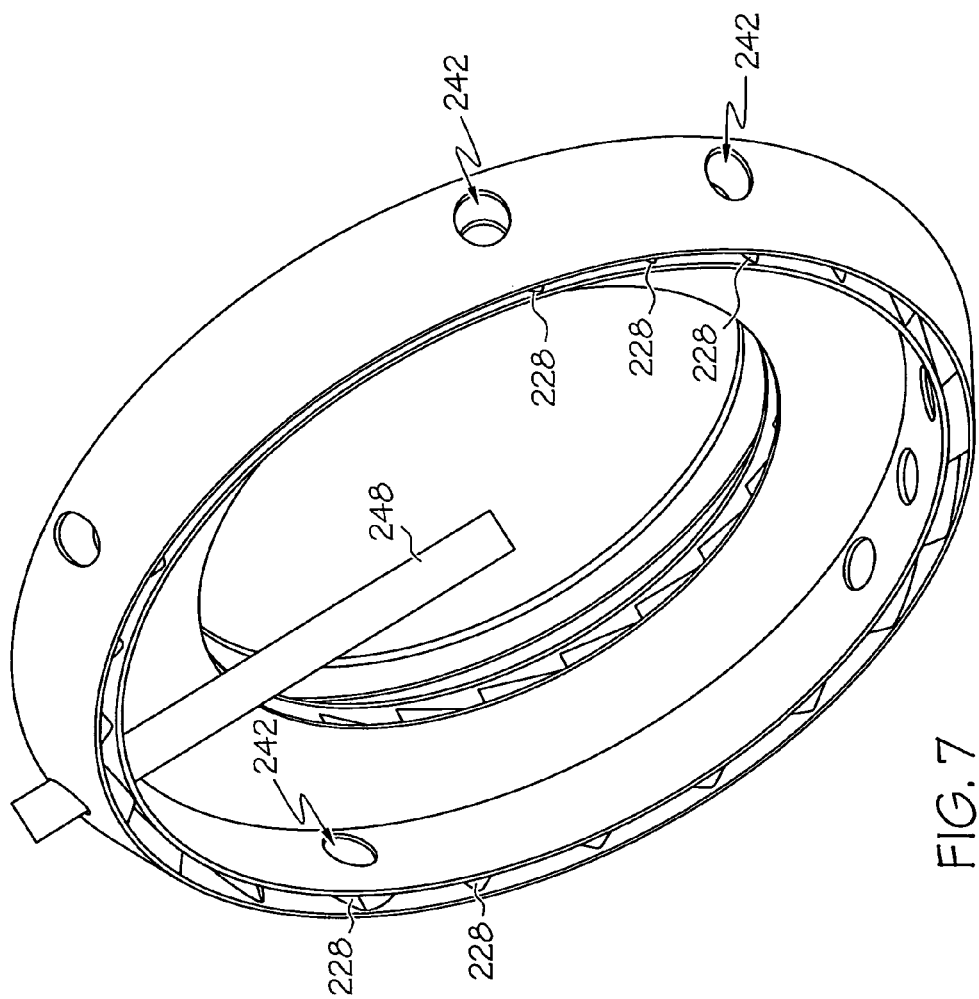
FIG. 7 provides a three dimensional isometric, aft quartering view of the integral service vanes of FIG. 3.
Figure 8:
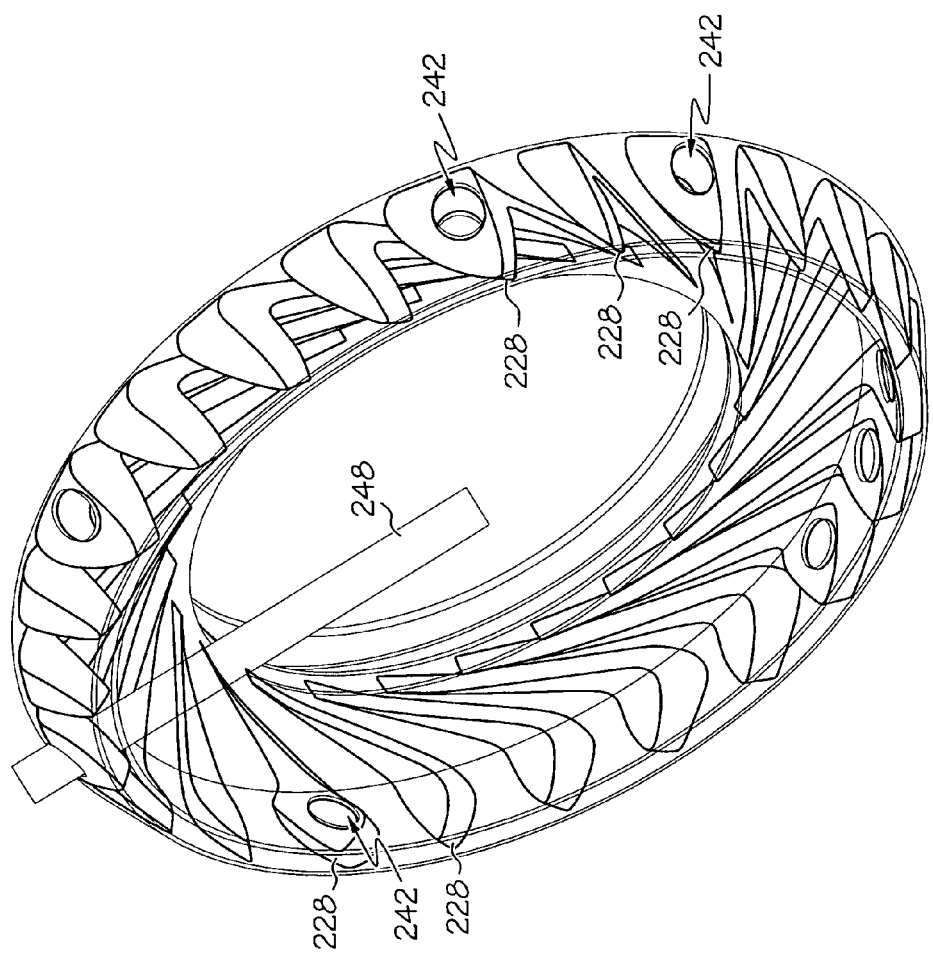
FIG. 8 provides another three dimensional isometric, aft quartering view of the integral service vanes of FIG. 3.

Turning now to FIGS. 6-8, various views of an exemplary embodiment of the integral service vanes 228, along with service passages 242 and a service conduit 248, are depicted. FIG. 6 provides a view, aft looking forward, of an exemplary embodiment. FIG. 7 provides a three dimensional isometric, aft quartering view of an exemplary embodiment. FIG. 8 provides another three dimensional isometric, aft quartering view of an exemplary embodiment, in which certain walls surrounding the integral service vanes 228 have been made transparent in one direction, to provide an even better view of the integral service vanes 228. As shown in FIGS. 6-8, service passages 242 may extend through any number of the integral service vanes 228, in any of numerous different possible arrangements. Also as illustrated in FIGS. 6-8, the integral service vanes 228 not having service passages 242 extending therethrough, if any, may optionally be made to have a thickness that is less than the thickness of the integral service vanes 228 having service passages 242 extending therethrough, in order to reduce manufacturing costs and/or decrease the weight of the diffuser 210.

Although the diffuser 210 was depicted and described herein as being implemented in an engine 100 with a compressor 102 having a two-stage centrifugal compressor and various other specific characteristics, it will be appreciated that the diffuser 210 can also be implemented in various other types of compressors, and in various types of engines, turbochargers, and various other fluid devices, and in various other systems and environments. However, regardless of the particular implementations, the diffuser 210, engine 100, and compressor 102 described above in their various embodiments allow for improved oil and air service to a bearing cavity 112 and/or other inner regions of the engine 102, while maintaining superior performance characteristics of a radial vane diffuser.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A radial diffuser for directing a flow of compressed air with a radial component to a diffused annular flow having an axial component, the radial diffuser comprising:
   a housing including an air inlet and an air outlet, and defining a radial section, an axial section, and a transition between the air inlet and air outlet, the radial section extending at least substantially radially outward from the air inlet to the transition, the axial section extending at least substantially axially from the transition to the air outlet, the transition including a bend and extending between the radial section and the axial section;
   a plurality of diffuser vanes coupled to the housing and extending through the radial section and the transition, each of the plurality of diffuser vanes defining a diffusion flow passage through the radial section and a transition flow passage through the transition, the transition flow passage in fluid communication with the diffusion flow passage, at least one of the plurality of diffuser vanes including a service passage extending therethrough, the service passage configured to allow a service conduit to extend therethrough without crossing either the diffusion flow passage or the transition flow passage.

2. The radial diffuser of claim 1, wherein:
   the bend provides an at least substantially continuous turn between the radial section and the axial section.

3. The radial diffuser of claim 1, wherein:
   each of the plurality of diffuser vanes has a first vane component defining the diffusion flow passage and a second vane component defining the transition flow passage; and
   the second vane component has a thickness that is greater than a thickness of the first vane component.

4. The radial diffuser of claim 1, wherein:
   the first vane component is made at least in part from a first material;
   the second vane component is made at least in part from a second material; and
   the second material is lighter than the first material.

5. The radial diffuser of claim 4, wherein:
   the first material is steel.

6. The radial diffuser of claim 4, wherein:
   the second material is selected from the group consisting of titanium, aluminum, and plastic.

7. The radial diffuser of claim 1, wherein each of the plurality of diffuser vanes is also configured to deswirl the diffused air.

8. The radial diffuser of claim 1, farther comprising:
   one or more service conduits extending through the service passage.

9. The radial diffuser of claim 8, wherein: the one or more service conduits are made of metal tubing.

10. The radial diffuser of claim 1, wherein:
    the service passage is further configured to allow a structural tie with one or more external structures.

11. A gas turbine engine, comprising:
    an engine housing;
    a compressor, a combustor, and a turbine all mounted in flow series within the housing, the compressor including at least:
        a compressor housing;
        an impeller rotationally mounted within the compressor housing and having a leading edge and a trailing edge, the impeller operable, upon rotation thereof, to discharge a flow of air having a velocity magnitude and a pressure magnitude from the trailing edge; and
        a radial diffuser for directing a flow of compressed air with a radial component to a diffused annular flow having an axial component, the radial diffuser comprising:
            a diffuser housing including an air inlet and an air outlet, and defining a radial section, an axial section, and a transition between the air inlet and air outlet, the air inlet in fluid communication with the impeller trailing edge to thereby receive the flow of air discharged therefrom, the radial section extending at least substantially radially outward from the air inlet to the transition, the axial section extending at least substantially axially from the transition to the air outlet, the transition including a bend and extending between the radial section and the axial section;
            a plurality of diffuser vanes coupled to the diffuser housing and extending through the radial section and the transition, each of the plurality of diffuser vanes defining a diffusion flow passage through the radial section and a transition flow passage through the transition, the transition flow passage in fluid communication with the diffusion flow passage, at least one of the plurality of diffuser vanes including a service passage extending therethrough, the service passage configured to allow a service conduit to extend therethrough without crossing either the diffusion flow passage or the transition flow passage.

12. The gas turbine engine of claim 11, wherein:
    each of the plurality of diffuser vanes has a first vane component defining the diffusion flow passage and a second vane component defining the transition flow passage; and
    the second vane component has a thickness that is greater than a thickness of the first vane component.

13. The gas turbine engine of claim 11, wherein:
the first vane component is made at least in part from a first material;
the second vane component is made at least in part from a second material; and
the second material is lighter than the first material.

14. The gas turbine engine of claim 11, -wherein each of the plurality of diffuser vanes is also configured to deswirl the diffused air.

15. A diffuser for directing a flow of compressed air with a radial component to a diffused annular flow having an axial component, the diffuser comprising:
a housing including an air inlet and an air outlet, and defining a radial section, an axial section, and a transition between the air inlet and air outlet, the radial section extending at least substantially radially outward from the air inlet to the transition, the axial section extending at least substantially axially from the transition to the air outlet, the transition including a bend and extending between the radial section and the axial section;
a plurality of diffuser vanes coupled to the housing and extending through the radial section, the transition, and the axial section, each of the plurality of diffuser vanes defining a diffusion flow passage through the radial section and a deswirl flow passage through the axial section, wherein air is diffused in the diffusion flow passage and is deswirled in the deswirl flow passage of the same diffuser vane, at least one of the plurality of diffuser vanes including a service passage extending therethrough, the service passage configured to allow a service conduit to extend therethrough without crossing the diffusion flow passage.

16. The diffuser of claim 15, wherein the bend provides an at least substantially continuous turn between the radial section and the axial section.

17. The diffuser of claim 15, wherein each of the plurality of diffuser vanes further defines a transition flow passage through the transition, the transition flow passage in fluid communication with the diffusion flow passage and the deswirl flow passage.

18. The diffuser of claim 17, wherein:
each of the plurality of diffuser vanes has a first vane component defining the diffusion flow passage, a second vane component defining the transition flow passage, and a third vane component comprising the deswirl flow passage.

19. The diffuser of claim 18, wherein the second vane component has a thickness that is greater than a thickness of the first vane component.

20. The diffuser of claim 18, further comprising:
one or more service conduits extending through the service passage.

* * * * *

UNITED STATES PATENT AND TRADEMARK OFFICE
CERTIFICATE OF CORRECTION

PATENT NO. : 7,717,672 B2
APPLICATION NO. : 11/512559
DATED : May 18, 2010
INVENTOR(S) : Barton et al.

It is certified that error appears in the above-identified patent and that said Letters Patent is hereby corrected as shown below:

Column 8, line 12, "farther" should be changed to --further--.

Signed and Sealed this

Twenty-seventh Day of July, 2010

David J. Kappos
*Director of the United States Patent and Trademark Office*